United States Patent Office.

HENRY BETTS, OF NORWALK, CONNECTICUT.

*Letters Patent No.* 49,069, *dated August* 1, 1865; *reissue No.* 3,228, *dated December* 15, 1868.

IMPROVEMENT IN THE MANUFACTURE OF PAPER-STOCK.

The Schedule referred to in these Letters Patent and making part of the same.

*To all whom it may concern:*

Be it known that I, HENRY BETTS, have discovered a new Material for the Manufacture of Paper, and have invented a new kind of Paper-Stock; and I do hereby declare that the following is a full, clear, and exact description of the same.

The nature of my discovery and invention consists in the manufacture of paper-stock from the stalks and roots of the plant usually known as sedge, hitherto considered useless for all commercial purposes.

To enable others skilled to avail themselves of my discovery and invention, I will proceed to describe it more in detail.

By a series of experiments, I have ascertained that the plant known as sedge, and which has heretofore been considered as almost wholly useless, can be used very successfully and economically in the manufacture of paper-stock.

This plant belongs to the *Cyperaceæ*, and genus *Carex*, and is usually found growing in waste marshy places, especially along the sea-shore, where the ground is subject to overflow, and unfit for cultivation.

It is also found in large quantities in and about the inland or fresh-water marshes of the country.

This plant is a perennial, and grows, without culture or care, in dense masses, producing a heavy growth of stalks and leaves above ground, and a mass of fine fibrous roots in the soil, to the depth of from six to ten inches.

In manufacturing paper from the stalks of the sedge, I prefer to cut it while green, or before it is ripened, and the stalk becomes hard; and as the plant is a very rapid and vigorous grower, I am thus enabled to obtain at least two crops in a season from the same ground.

I also find that it is the more readily converted into pulp by cutting it before its becoming fully ripe.

In preparing it for use, I first cut the stalks, and permit them to lie on the ground as long as possible without injury to the fibre, after which they are gathered into stacks for use.

The first step in the process is to cut it up, by means of an ordinary straw-cutter, after which it is placed in a tank, and thoroughly washed by running a stream of clear water through it.

It is then boiled in a solution of caustic soda, until perfectly soft, after which it is put into the breaking-engine and mashed into what is technically termed "half stuff."

The machine which I prefer for converting this into merchantable paper-stock, is constructed similar to the ordinary engine, except that I prefer to use fly-bars of such form as to beat and press out the fibre, instead of cutting it with sharp edges.

The remaining processes are the same as are ordinarily used in the manufacture of paper, and therefore need not be specially described.

In utilizing the roots of this plant, I cut or dig up the soft marshy soil in which it usually grows, to the depth of eight or ten inches, the greater portion of which I find to be a dense mass of fine roots. This is then washed sufficiently to separate the mass of roots from the soft mud or earth in which they are embedded, after which they are converted into paper, in nearly the same manner as the stalks.

I find this material remarkably well adapted for the purpose of making paper, it being very strong, and remarkably free from silex, and hence making a very tough, yet soft and pliable paper. It bleaches readily, and therefore can be made into fine white paper with great ease.

In the manufacture of the coarser and harder kinds of paper, such as binders' boards, I propose to use, in connection with the products of the sedge-plant, as above described, certain portions of corn-stalks, such as are left after the leaves and husks have been removed, and used for forage or other purposes.

In certain cases I also propose to use sawdust, meaning thereby, not wood fibre specially disintegrated for the purpose of making paper-pulp, but the ordinary refuse sawdust as it comes from the saw-mill, or wood-worker's shop.

These ingredients can, either or both of them, be reduced to paper-stock or pulp by processes well known to paper-makers, and which need not, therefore, be herein described.

The amount of either or both of these ingredients which may be used, will of course be regulated by the article that is intended to be produced, and will therefore be controlled by the judgment of the operator.

By my discovery or invention, I am enabled to produce a very superior and cheap article of paper, in immense quantities, and this I do by using an article which has, previous to my discovery, possessed no appreciable value, millions of tons of it being permitted to annually rot and go to waste.

I claim as my invention or discovery, the application of the fibres of the stalks, and also of the root of the plant known as sedge, to the manufacture of fine white or colored paper, whether the same be used in combination with other ingredients, or separate, as herein set forth.

HENRY BETTS.

Witnesses:
JOSEPH W. WILSON,
JULIA P. WILSON.